US005247732A

United States Patent [19]

Lait et al.

[11] Patent Number: 5,247,732

[45] Date of Patent: Sep. 28, 1993

[54] CABLE HANDLING AND PREPARATION APPARATUS

[75] Inventors: Michael J. Lait; Timothy D. Hall, both of Bristol; William J. Harrison, Cambridge; Graham S. Gutsell, Cambridge; Adam Kruczynski, Cambridge, all of Great Britain

[73] Assignee: British Aerospace Public Limited Company, London, England

[21] Appl. No.: 864,467

[22] Filed: Apr. 6, 1992

[30] Foreign Application Priority Data

Apr. 9, 1991 [GB] United Kingdom ................ 9107431

[51] Int. Cl.[5] ...................... H01R 43/04; B23K 26/00

[52] U.S. Cl. ................................ 29/564.4; 29/33 M; 29/753; 219/121.68

[58] Field of Search ................ 29/33 M, 564.4, 564.6, 29/564.8, 566.1, 566.2, 753, 749, 857, 861, 748; 219/121.68, 121.69; 81/9.51

[56] References Cited

U.S. PATENT DOCUMENTS 4,521,946 6/1985 Dusel et al. ........................ 29/33 M
4,581,796 4/1986 Fukuda et al. ..................... 29/33 M
4,628,600 12/1986 Gordon et al. .................. 29/749 X
4,704,775 11/1987 Cross ................................ 29/33 M
4,713,880 12/1987 Dusel et al. ....................... 29/564.4
4,833,778 5/1989 Loustau ......................... 29/564.4 X
5,049,721 9/1991 Parnas et al. .................. 219/121.68

FOREIGN PATENT DOCUMENTS 0290641 11/1988 European Pat. Off. .
0329884 8/1989 European Pat. Off. .

*Primary Examiner*—William Briggs
*Attorney, Agent, or Firm*—Cushman, Darby & Cushman

[57] ABSTRACT

Cable handling and preparation apparatus comprising a cable source (12), cable stripping and crimping means (14), length determining means, robotic control means (13), cable guidance (43) and marking (11) means and cable conveying means (16). The arrangement is such that at least one cable or possibly more can be selectively drawn from a source comprising several powered cable reels (18) holding cables of different size by the robotic control means (13), subjected to processing by the stripping and crimping means (14) and subjected to marking, preferably laser marking, along its length, the prepared cable simultaneously and progressively being conveyed from the apparatus by the conveying means (16).

19 Claims, 6 Drawing Sheets

CABLE HANDLING AND PREPARATION APPARATUS

This invention relates to cable handling and preparation apparatus particularly, though not exclusively, for use in the preparation and manufacture of electrical wiring looms. It furthermore relates, though not exclusively so, to cable handling apparatus used in conjunction with apparatus for imparting identifying marks, for example a part number, at spaced positions along the length of one or more cables.

According to one aspect of the present invention, there is provided cable handling and preparation apparatus, said apparatus comprising a cable source, cable stripping and crimping means, length determining means, robotic control means, cable guidance and marking means and cable conveying means the arrangement being such that at least one cable is selectively drawn from the source by said robotic control means, subjected to processing by said stripping and crimping means and length determining means, and subjected to a marking process along its length, said prepared cable simultaneously and progressively being conveyed from said apparatus by said conveying means.

Preferably said cable marking means comprises ultraviolet laser marking apparatus and laser shielding means.

Preferably, the cable handling apparatus also includes protective sleeve means associated with each of said cables, said protective sleeve means being constrained to prevent the bend radius to which said cables are subjected reducing below a minimum value.

The cable guidance means may comprise a guide shoe having a generally vee-shaped guide element formed to receive and guide, within the vee, a range of cables of different size, the guide shoe being disposed on an opposite side of the cable to the laser marking apparatus whereby to engage the cable being drawn past the laser marking apparatus under tension and urge same to the focal point of the laser beam, the vee form providing both vertical and horizontal location to the moving cable as it passes the laser marking apparatus.

The generally vee-shaped guide element may comprise a groove extending longitudinally of the cable, the groove having a curved longitudinal axis whereby to direct the cable in a curved path past the laser beam.

Preferably the guide shoe is moveable between a range of positions of use to ensure that a face to be marked of a cable of each size is positioned at the focal point of the laser beam.

The guide shoe is desirably moveable between a retracted position disengaged from the cable and said range of positions of use.

The apparatus may comprise tubular laser shielding means on the laser marking apparatus surrounding the laser beam, said tubular laser shielding means being engageable in a slot formed in the cable guidance means substantially to enclose the laser beam during laser marking.

The apparatus preferably includes an interface arrangement operative between the cable source and the robotic control means, the arrangement including a park rail having means releasably to hold the leading end of each cable and of each protective sleeve means, each protective sleeve means including means to engage the park rail and means simultaneously to engage the robotic control means during cable removal from and replacement to the park rail thereby.

Preferably the means on the protective sleeve means to engage both the park rail and robotic control means comprise spaced groove to be gripped by jaws on both the park rail and robotic control means.

The conveying means may comprise dual longitudinal conveyor belts in which adjacent surfaces of the respective belts are in close abutment to engage and convey cable from the remainder of said apparatus without imposing a significant tension on the cable emerging from the remainder of the apparatus.

Preferably the longitudinal speed of the belts is in the region 95 to 99% speed of cable leaving the remainder of the apparatus.

One end of the cable may be held at a position to one side of the conveying means such that a loop of cable engages between the belts and is conveyed by the conveying means from the remainder of the apparatus.

Preferably once the cable has been cut and separated from the cable at the source, the cut end is conveyed along the conveying means until tension from the held end of the cable unwinds the loop and the cable is substantially fully extended whereupon said tension draws the cut end sideways and outwardly from between the belts for the complete cable to fall into a receptacle lying alongside the belts.

The opposed belts are desirably in spaced relationship for part of their length to assist entry of the cable therebetween.

Preferably the cable source includes a series of cable reels having powered de-reeling capability and further includes take-up means comprising spaced first and second pulleys around which the cable passes, the spacing of the pulleys being variable to allow the take-up means to take up more or less cable as required.

At least one first pulley may be urged away from at least one second pulley by gravity and mounted on a swingable arm.

Preferably swinging movement of the arm is used to control operation of a powered de-reeling motor to drive the cable drum.

Preferably the position of the swingable arm is used to operate at least an on switch and an off switch spaced therefrom on the arc of movement of the arm.

The apparatus may include motor speed control means giving a speed signal to the motor dependant upon the position of the swingable arm on its arc of movement.

One embodiment of the invention will now be described, by way of example only, and with reference to the accompanying drawings in which:

FIG. 1 schematically illustrates a cable handling and preparation apparatus used in conjunction with a laser cable marking system.

Figure 1:
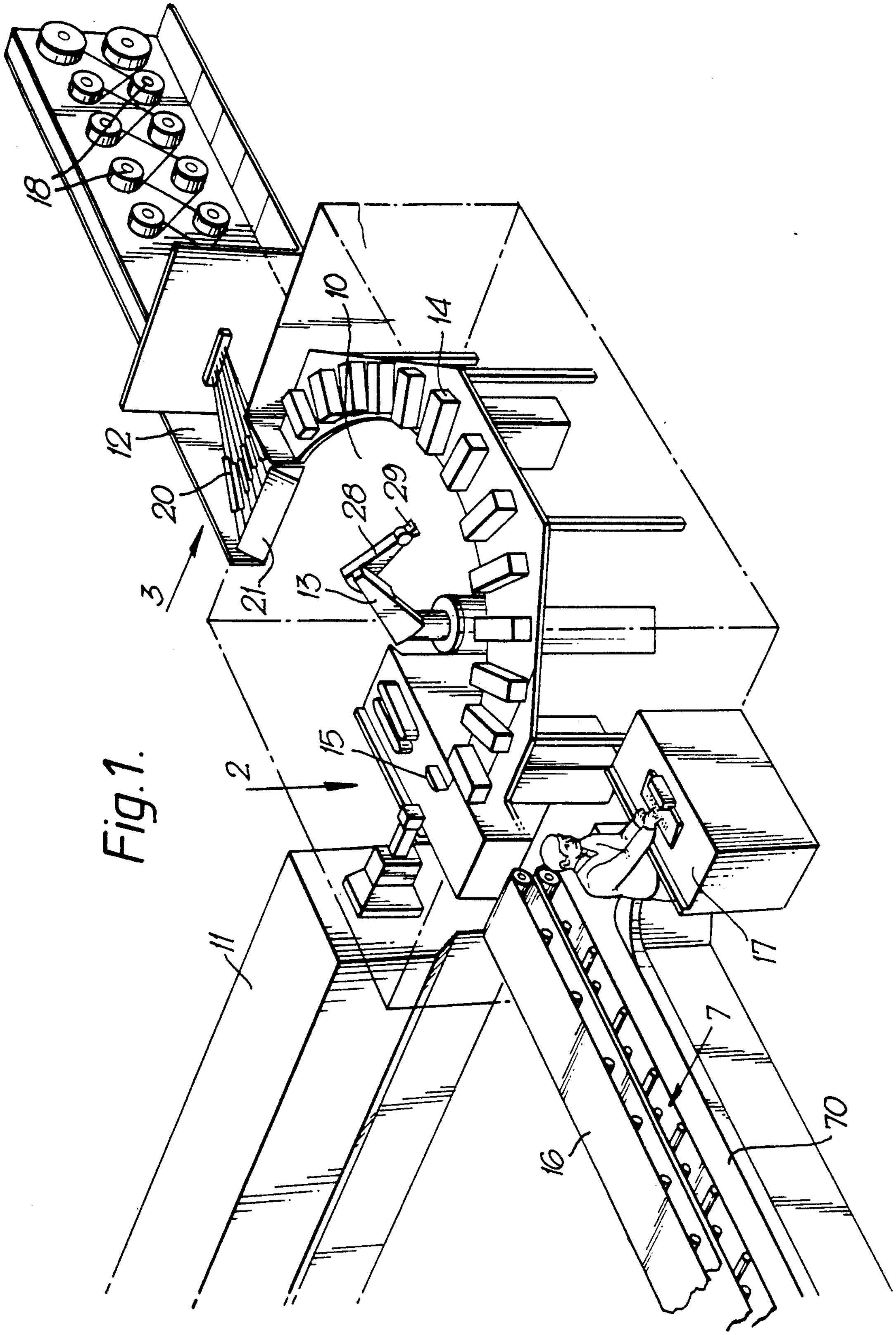

Referring to the drawings FIG. 1 illustrates schematically cable handling and preparation apparatus 10 used in connection with a laser cable marking apparatus 11 and principally comprises a cable pre-feeder assembly 12, a computer-controlled robot 13, a selection of strip and crimp tools 14, a feed, mark and guidance apparatus 15 and a dual element conveyor belt 16. The arrangement is operator controlled from a console 17.

Figure 3:
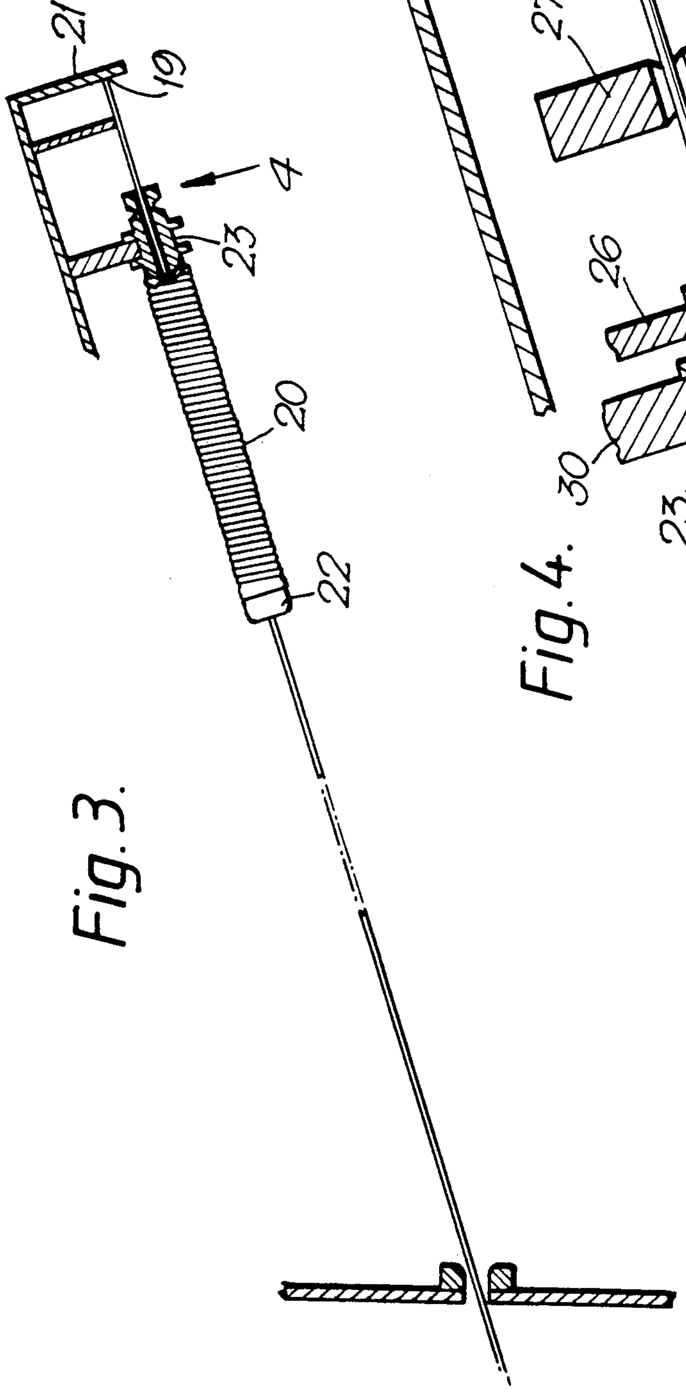
FIG. 3 is partial side elevation of the cable pre-feeder arrangement forming part of the present invention and viewed in direction of Arrow 3 in FIG. 1.
Figure 4:
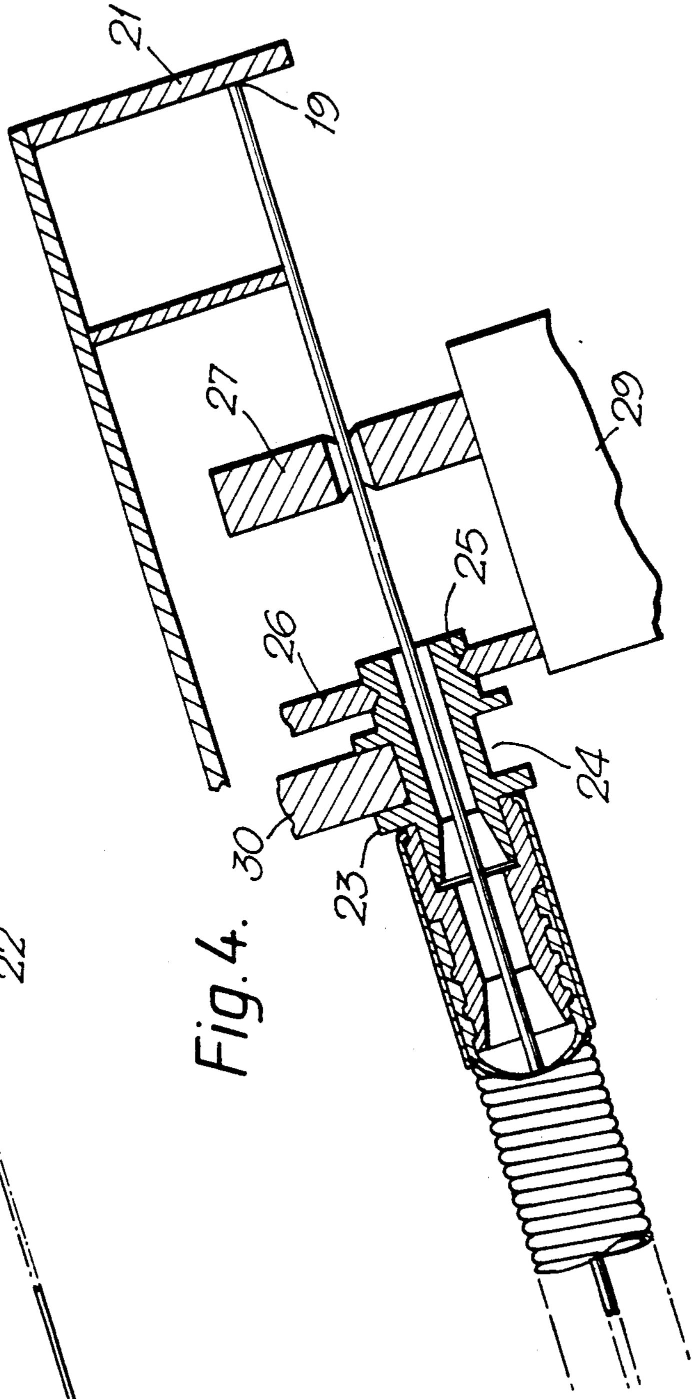
FIG. 4 is a localized detail to a larger scale of the arrangement of FIG. 3.

Referring now to FIG. 1 in conjunction with FIGS. 3 and 4 the pre-feeder 12 is a multi-channel system providing storage and powered de-reeling of up to twenty manually loaded cable drums 18. The cables stored on the drums are of different sizes in accordance with particular requirements.

Figure 8:
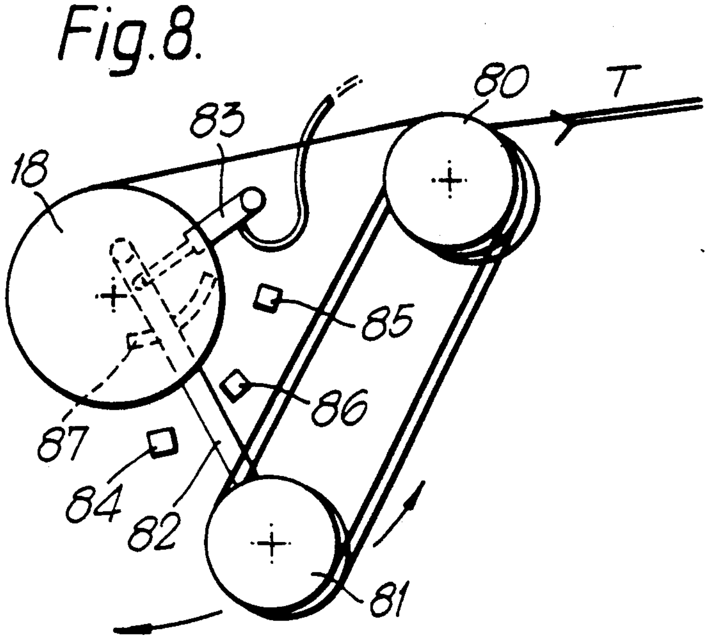
FIG. 8 is a schematic side view of tensioning means used in the pre-feeder.
Figure 9:
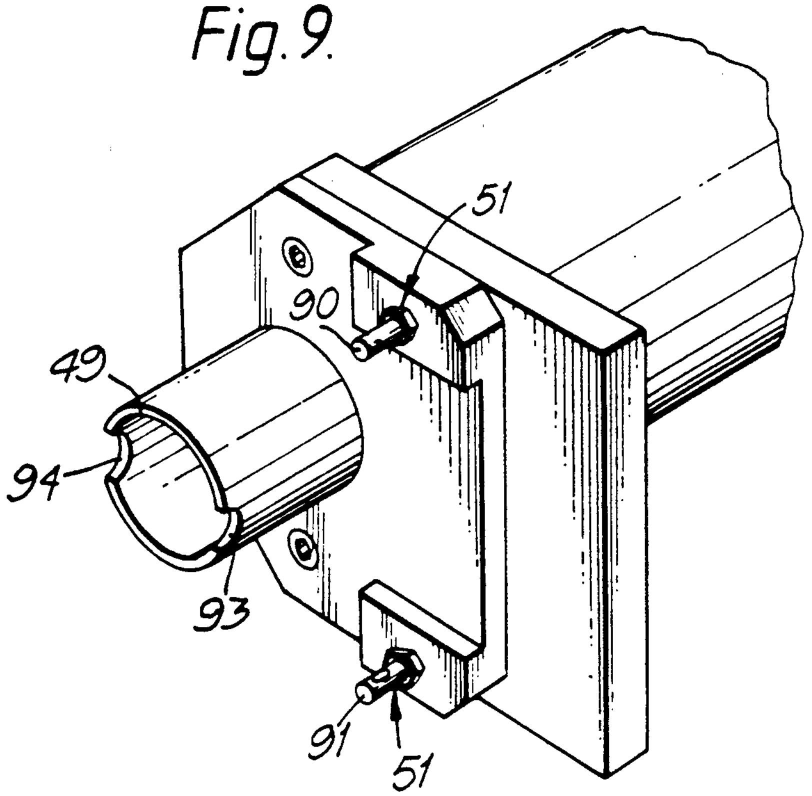
FIG. 9 is a perspective view of the laser shield arrangement and cable sensor.

FIG. 8 shows tensioning means used in conjunction with each cable drum 18. The tensioning means comprises three independently rotatable pulleys 80 mounted on a fixed common pivot axis and two independently rotatable pulleys 81 mounted on one end of a pivoting control arm 82. The control arm 82 is pivotable in the directions of the arrows shown and, depending upon the combined weight of the control arm 82 and pulleys 81, can be urged clockwise or anti-clockwise by an optional control arm pre-load device 83 comprising a pressure controlled pneumatic cylinder. Tension in the cable can be adjusted accordingly by adjusting the pressure in the cylinder.

The cable flow path from the cable drum 18 is as shown by the arrows marked on the separate lengths of cable with the cable from the drum 18 having to pass over all five pulleys 80, 81 before progressing to an interface between the pre-feeder 12 and the robot 13.

The cable drum 18 is driven by a servo-motor (not shown) controlled in part by three micro-switches 84, 85, 86 and a resistance potentiometer 87. The micro-switches are each responsive to passage of the control arm 82 therepast and the speed of the servo-motor is governed by the position of the control arm 82 on the potentiometer 87.

In operation the robot 13 selects a leading end 19 of the cable wound on the cable drum 18 from an interface position at a park rail 21 and applies a tension to the cable. This tension tightens the cable around the pulleys 80, 81 and raises the control arm 82 thereby drawing the pulleys closer together. When the control arm 82 passes the micro-switch 86 in an upward direction the servo-motor is switched on.

The movement of the control arm 82 across the potentiometer 87 controls the speed of the servo motor. The speed of the servo motor is at a minimum when the control arm 82 is passing micro-switch 86 and increases as the control arm moves upwards. As the tension in the cable decreases the control arm 82 swings downwards. As the control arm passes micro-switch 86 in a downward direction the servo motor is switched off.

The micro-switches 84 and 85 are positioned so as to stop operation of the whole apparatus instantaneously should the control arm 82 activate either of the said switches. The conditions bringing about such activation could be for example cable breakage causing the control arm 82 to drop under its own weight, activating micro-switch 84, or the cable snagging on the drum 18 causing the control arm to rise, activating micro-switch 85.

The number of pulleys and length of cable run thereover are arranged and dimensioned such that loosening of the cable caused by return of a cut leading end 19 of the cable by the robot 13 to its interface position at the park rail 21 after processing (see FIGS. 3 and 4) can be readily absorbed solely by movement of the control arm downwardly. This avoids the need to provide a reverse function for the servo motor.

As shown in FIG. 3 the leading ends 19 of the cables presented in the pre-feeder are each threaded through protective sleeves 20 in the pre-feeder and gripped at the park rail 21 which forms the said interface between the pre-feeder 12 and the robot 13.

When a particular cable is selected for processing its leading end 19 is picked from the park rail 21 by the robot 13 which subsequently inserts it into the appropriate strip and crimp tool 14, dependent upon the size and type of cable selected. Each strip tool is pre-set for a particular combination of cable diameter and strip length, whereas the crimp tools are automatically adjusted for cable diameter. Each crimp tool is dedicated to a particular type of crimp pin, fed from a pre-loaded magazine. The strip and crimp operation is well known and not further discussed here.

The protective sleeve 20 has a primary purpose of ensuring that when the cable is being handled, often at high speed, by the robot 13, a bend radius thereof never reduces below a minimum value. This protective sleeve 20 therefore consists of a length of spirally wound stainless steel conduit which is highly flexible down to a bend radius corresponding to that of the specified minimum figure for the largest cable, at which point it can bend no further. The sleeve 20 has fittings on each end. On the input end the fitting comprises a rounded entry guide 22 and on the output end comprises a fitting 23 with two grooves 24 and 25 groove 25 corresponding to the gripper jaws 26 and groove 24 corresponding to passive forks 30 associated with the park rail 21. The groove 24 has a rectangular profile and the groove 25 a 'vee' profile.

The leading ends 19 on all the cables stored in the pre-feeder 12 reside at the park rail 21. When new cable drums 18 are installed in the pre-feeder the leading end 19 is threaded via the sleeve 20 up to the park rail 21 manually and thereafter the park rail forms an interface between the pre-feeder 12 and the robot 13 and effectively forms a datum face. When in position at the park rail an individual cable is held by an appropriate cable gripper (not shown). This gripper maintains the cable substantially in contact with the park rail 21 determining the length of cable protruding from the gripper so that when the robot 13 picks the cable it has the correct length protruding beyond the sleeve 20. Simultaneously, the sleeves 20 are held in position at the park rail by passive forks 30 locating on the rectangular profile groove 24. Each fork 30 has a small spring-loaded retainer mechanism (not shown) to hold the sleeve 20 in position but allow its easy removal either manually or when picked by the robot. An alternative method proposed is for the retainer mechanism for each fork 30 to have the fork sprung to a closed position but opened by powered means, for example a pneumatic cylinder.

The computer controlled robot 13 incorporates a robot manipulator ar 28 whose principal function is to pick the leading end of the selected cable from the park rail 21, insert it into the appropriate strip and crimp tools, as previously described, then load it into the feed, mark and guidance apparatus 15.

The manipulator arm 28 incorporates a manipulator head 29 including the cable gripper jaw 27 and sleeve gripper jaw 26 actuated by compressed air. This is illustrated in FIG. 4. In this embodiment when the robot 13 picks a cable a 25 m.m. length of cable protrudes from the cable gripper jaw 27, which is the minimum adequate length for interfacing with the strip and crimp tools 14. Throughout the strip and crimp cycle, the sleeve gripper jaw 26 rigidly engages the groove 25 of the end fitting 23 on the protective sleeve 20 to ensure that minimum bend criteria are not exceeded.

On completion of a strip and crimp mode the robot 13 transfers the cable and its associated protective sleeve 20 to one of a pair of loading arms in preparation for feeding and cable marking. This will now be described in detail by reference particularly to FIG. 2 being a plan view on cable handling and preparation apparatus 15, in this embodiment used in conjunction with laser cable marking apparatus 11.

Figure 2:
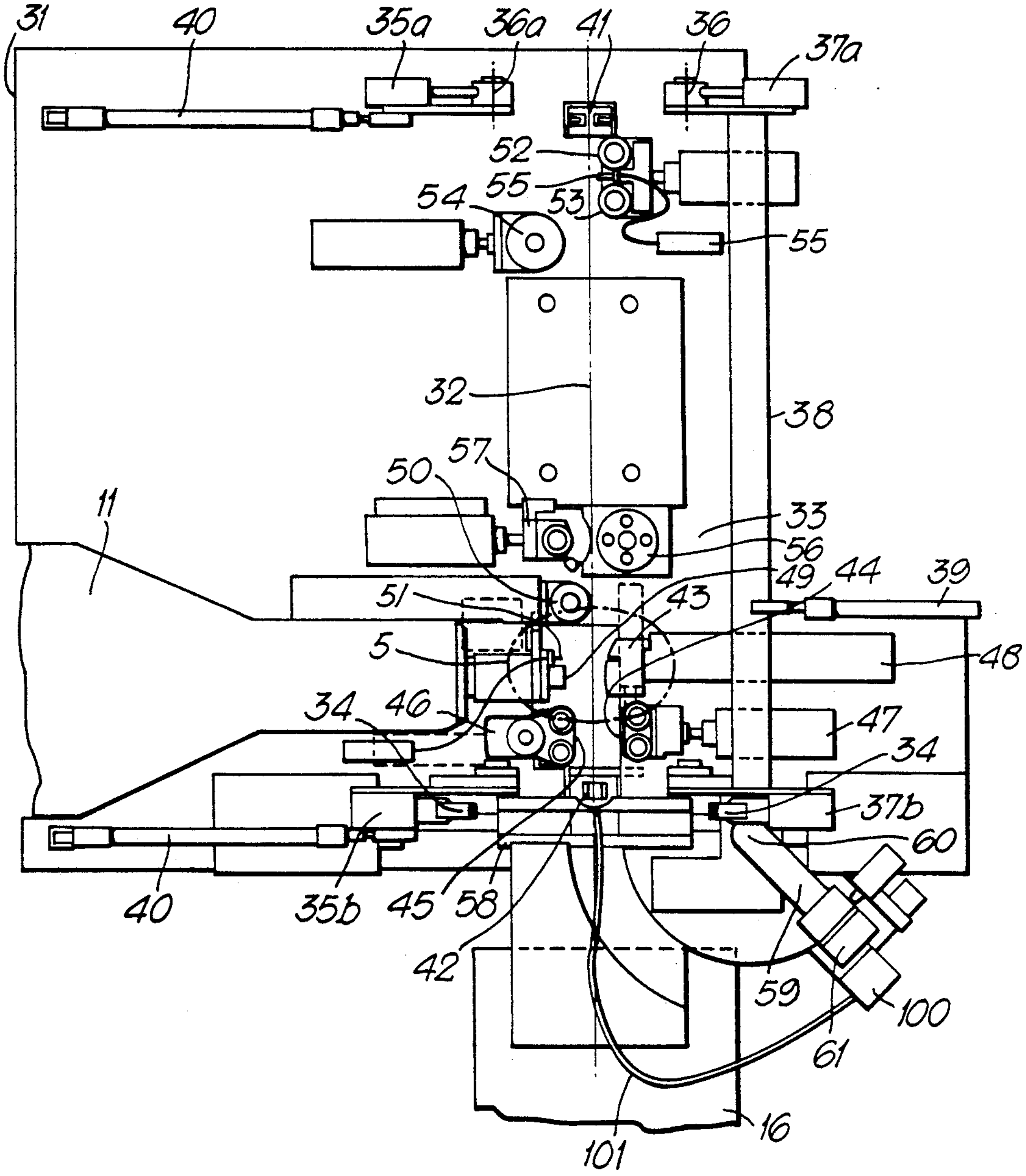
FIG. 2 is a plan view of the cable handling and preparation apparatus viewed in direction of Arrow 2 in FIG. 1.

Referring to FIG. 2, the principal elements of the apparatus ar mounted on pneumatic actuators which allows for retraction during cable loading/unloading. The assembly is mounted upon a baseplate 31 and, as shown in FIG. 2, the cables are moved downwardly from the top of the figure, which corresponds to the pre-feeder end of the cable handling and preparation apparatus (hereinafter referred to as the upstream end). The baseplate is located about a datum line 32 corresponding to the nominal centre line of the cable when positioned for marking. The laser powered cable marking apparatus 11 lies transversely to the datum 32.

Two loading arm assemblies are employed in this embodiment and each form the interface between the robot 13 and the feed, mark and guidance apparatus 33. Each assembly comprises an upstream loading arm 35*a* and 37*a* incorporating a sleeve gripper (not shown) and a downstream loading arm 35*b* and 37*b* incorporating a cable gripper 34, each rotatable about a horizontal pivot axis 36. The loading arms 35*a* and 35*b* are each actuated by their own actuator 40. The loading arms 37*a* and 37*b* however are interconnected by a cross-bar 38 and driven by a single double acting actuator 39. The use of twin loading arm assemblies is desirable in order to optimise cable processing time.

The remaining principal elements of the feed, mark and guidance apparatus 33 and their function will now be described:

Sleeve gripper 41. The sleeve gripper 41 takes the sleeve 20 from one or other of the loading arms 35*a*, 37*a* and locates on the vee profile groove 25 thereof. During feeding the protective sleeve 20 acts as a cable guide.

Cable gripper 42. The cable gripper 42 is mounted on a pneumatic linear slide unit (not identified) which allows it to be retracted upstream until adjacent with the laser guide shoe 43. After it has been handed a cable, when in a forward position, by one of the loading arms it retracts to allow the first mark to be put on the cable at the specified distance from the crimp pin, and then returns to the forward position. The gripper 42 then holds the cable until the feed, mark and guidance feed elements have assumed control. Throughout feeding it is open, but closes again before cutting and handing back to one of the loading arms.

Cable drive. The cable drive system consists of two opposing timing belts 44 and 45 one of which provides traction to the cable, the other a reaction force. The drive belt 45 is coated with a thin layer of synthetic rubber to improve the traction with the cable and it runs around three pulleys, the rear one of which is driven by a DC servo motor mounted under the base plate. The reaction belt is plain neoprene and runs on two idler pulleys.

The drive belt 45 is mounted on a pneumatic linear slide unit 46, and the reaction belt 44 is mounted on a non-rotating double acting cylinder 47. Both actuators open sufficiently far to allow the cable gripper to pass between them to the 'first mark' position. The reaction belt actuator is of larger bore than the drive belt actuator so when they close onto a cable, the reaction belt actuator always comes up to its travel stop, thereby establishing a fixed datum position.

Guide shoe and laser shield. During marking the cable has to be accurately aligned with the laser beam and positioned at its focal point. Furthermore, because of the UV hazard, the beam has to be rigorously shielded throughout marking.

Figure 5:
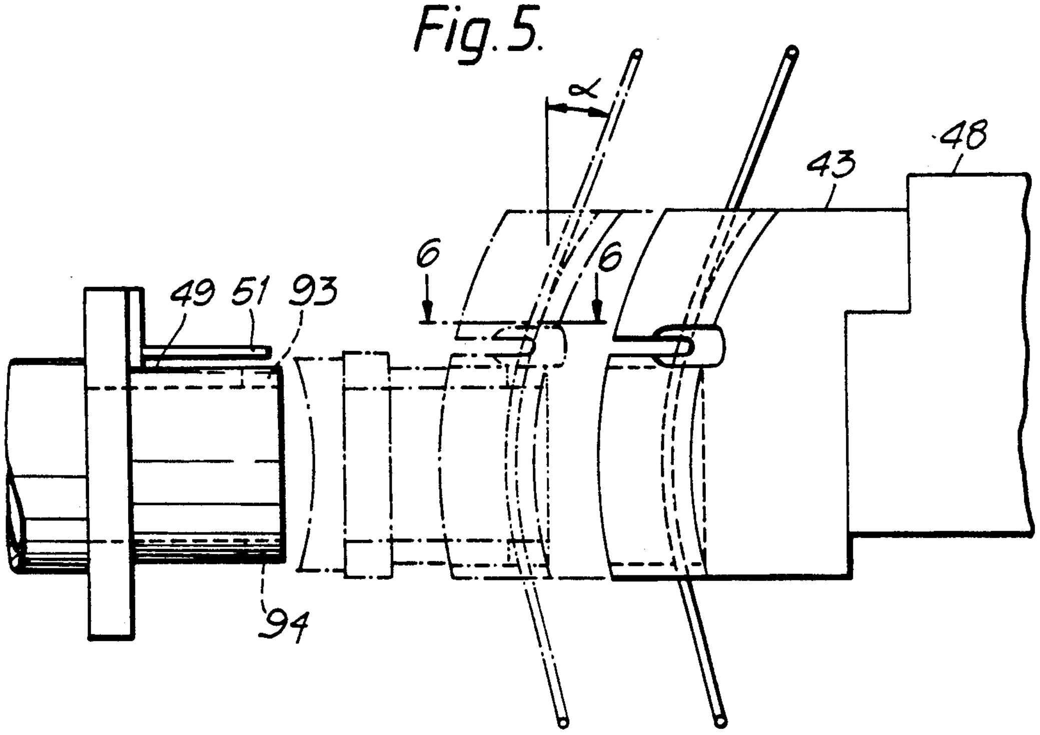
FIG. 5 is a detail to a larger scale, as indicated in FIG. 2, of the guide shoe and laser shield arrangement for use in the cable marking mode.
Figure 6:
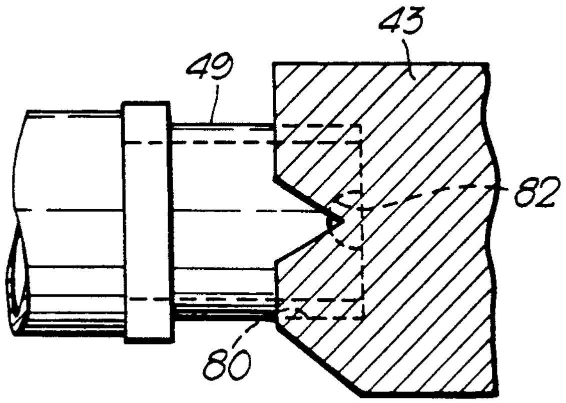
FIG. 6 is a sectional view of the guide shoe and laser shield arrangement viewed in direction of arrows '6—6' in FIG. 5.

Referring to FIGS. 5 and 6 in conjunction with FIG. 2, in order to position the cable correctly, it is driven under tension across a hard nickel-plated vee-groove guide shoe 43 which has a curved head surface, as shown in FIG. 5, to ensure that the cable is drawn into the vee-groove towards the base of the V as it passes in front of the laser and so is located in a repeatable fashion for accurate laser marking. The guide shoe 43 is mounted on a pneumatic linear slide unit 48 which has an automatically adjustable forward stop position, so that the writing face of the cable can be correctly positioned for all diameters of cable. The adjustable stop is driven by a stepper motor mounted at the rear of the linear slide 48.

The laser shield 49 is a telescopic, black anodised cylinder driven by a double acting pneumatic actuator under the baseplate. It enters into an annular groove 92 in the shoe 43 to ensure that the beam is fully shielded, leaving just two small apertures 93, 94 for cable entry and exit from the marking area.

Wrap roller 50. The wrap roller 50 is a vee-groove stainless steel pulley which guides the cable into the guide shoe 43. It is mounted on a linear slide unit with an automatically adjustable forward stop position (identical to the guide shoe actuator). The forward stop adjustment allows a guide angle to be set, as a function of cable diameter.

Cable Sensor 51. The cable sensor consists of a light beam traversing a gap between two fibre-optic heads 90, 91 situated on the laser shield 49 assembly. If the shield 49, and guide shoe 43, are correctly positioned, and if the cable is present, the beam will be interrupted. Failure to interrupt the beam indicates that one of the conditions is not met and that there could therefore be a UV hazard, in which case the laser is disabled and the whole apparatus may also be disabled and/or a warning signalled to the operator.

The light source and transducer unit is mounted, on the baseplate, adjacent to the laser shield and its status is indicated locally by two LEDs.

Knot and splice detector. The knot and splice detector consists of three stainless steel rollers 52,53 and 54 positioned in such a way that one side of all cables (independent of diameter) passes very close to a light beam, but not actually interrupting it. If a cable has a local increase in diameter at any point along its length, the light beam will be interrupted as it passes by. The interruption of the beam causes the system to stop.

The light beam is produced by a unit 55 identical to the cable sensor, and the fibre optic heads (between which the beam passes) are mounted between two plain cylindrical stainless steel rollers. The whole latter arrangement is mounted on a non-rotating pneumatic actuator.

The third roller 54, which keeps the cable in contact with the first two, is a stainless steel vee-groove roller and is mounted on a similar pneumatic actuator.

Encoder. In order to monitor the cable length driven through the system by the main drive, a high resolution incremental encoder (not shown) is fitted. It is mounted directly into the main baseplate and is driven form the cable by means of a large diameter, low inertia pulley 56 disposed thereabove.

The cable is pinched between the encoder pulley 56 and a stainless steel pressure roller which is mounted on a non-rotating pneumatic actuator 57.

Cutter 58. The cable cutter is a heavy duty device configured specially for this application. Two large bore pneumatic actuators drive two hardened and ground vee-blades running in bronze guideways. The blades simultaneously cut into the cable form opposite sides and then retract.

The quality of cut is extremely high and is a fundamental requirement for reliable stripping and crimping on the subsequent occasion that a particular cable is used.

The apparatus further includes a swinging arm 59 angularly displaceable about a vertical pivot axis 60 and includes a cable gripper 61. A reciprocating gripper pair 100 is located to permit the leading end 19 of the cable to be located when delivered to it by the swinging arm 59.

Figure 7:
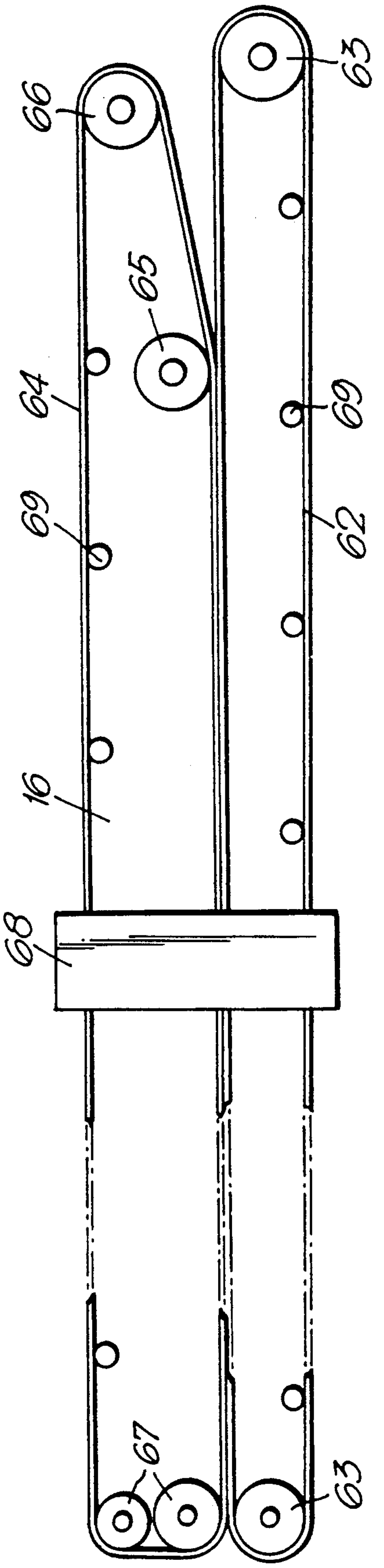
FIG. 7 is a side elevation of the cable conveyor assembly.

With further reference to FIG. 1 in conjunction with FIG. 7 downstream of the feed, mark and guidance apparatus is a dual element conveyor belt 16 comprising a lower belt 62 mounted upon a pair of rollers 63 and an upper belt 64 mounted at its upstream end on offset rollers 65 and 66 to provide a cable lead-in and twin rollers 67 at the downstream end. A common drive unit 68 is employed. The belts are supported along their upper and lower surfaces by support rollers 69, but their inner surfaces are in close abutment whereby treated cable 101 leaving the remainder of the apparatus is conveyed and deposited in a longitudinal receptacle or tough 70 running alongside. The speed of the conveyor belts is slightly less than the speed of cable extraction, being preferably 95-99% speed of cable leaving the remainder of the apparatus and most preferably 97–98% of said leaving speed, to obviate any undesirable pull on the cable during the marking process.

The normal sequence of operation of the feed, mark and guidance system will now be briefly described. The sequence of operation of desired cable selection from the pre-feeder together with the strip and crimp mode has earlier been described and will not be further referred to.

a) Robot engages protective sleeve 20 in the loading arm sleeve gripper. Robot draws cable downstream to engage cable gripper 34.
b) Loading arm transfers sleeve 20 to sleeve gripper 41 and cable to cable gripper 42.
c) Laser shoe 43 and shield 49 close around cable as illustrated in FIG. 5.
d) Wrap roller 50 translates inwardly to engage cable.
e) Cable gripper 42 retracts in preparation for cable marking.
f) Laser places first mark on cable, cable gripper advances.
g) Drive belt and reaction belt close on cable.
h) Cable gripper 42 opens.
i) Encoder pinch roller 57 closes to pinch cable between roller and encoder 56.
j) Knot and splice detector 52, 53 and 54 engages.
k) Leading end of cable engages cable gripper 61 on swinging arm 59. Swinging arm displaced permitting the cable to engage reciprocating gripper pair 62. This occurs simultaneously with cable feed and mark and in so-doing a cable loop is formed which i turn engages the conveyor belt permitting the marked cable to be drawn lengthwise and deposited in the trough 70.
l) Cable gripper 42 closes and cable cut by cutter 58.
m) All feed control elements retract.
n) Loading arm collects cable from the feed, mark and guidance apparatus.
o) Robot collects cable from loading arm.
p) Robot re-engages sleeve 20 in park rail 21.

Repetition of this sequence for a range of cables of similar or different sizes can conveniently compose cable looms within the trough. Furthermore, although, as described, the cables are each marked with selected part numbers or identifying marks using the laser marking process, this is not a necessary feature. The program may be so adapted that the cable marking mode is isolated and the equipment used purely for the manufacture of processed cable lengths singly or in bundles for loom purposes where such marking is not required.

We claim:

1. Cable handling and preparation apparatus comprising:

a cable source;

robotic control means for selectively drawing at least one cable form the source;

means for stripping and crimping said at least one cable;

means for determining a length of the cable, said length determining means ensuring an adequate length of cable is subjected to a cable gripping an crimping process by said stripping and crimping means;

means for guiding the cable;

an ultra-violet laser marking apparatus for marking said at least one cable along a length thereof;

means for shielding a laser beam generated by said laser marking apparatus; and means for conveying said at least one cable simultaneously and progressively through the apparatus, said cable guiding means comprising a guide shoe having a generally vee-shaped guide element adapted to receive and guide a range of cables of different sizes therein, the guide shoe being disposed on a side of the cable opposite to the laser marking apparatus for engaging the cable being drawn past the laser marking apparatus under tension and urging the cable to a focal point of the laser beam, the vee-shaped guide element providing vertical and horizontal positioning of the moving cable as it passes the laser marking apparatus.

2. Apparatus according to claim in which the cable source includes a series of cable reels having powered de-reeling capability and further includes take-up members comprising at least spaced first and second pulleys around which the cable passes, the spacing of the pulleys being variable to allow the take-up members to take up more or less cable as required.

3. Apparatus according to claim 2 in which at least one first pulley is urged away from at least one second pulley by gravity.

4. Apparatus according to claim 1 in which the generally vee-shaped guide element comprises a groove extending longitudinally of the cable, the groove having a curved longitudinal axis to direct the cable in a curved path past the laser beam.

5. Apparatus according to claim 1 or 4 in which the guide shoe is moveable between a range of positions of use to ensure that a face to be marked of a cable of each size is positioned at the focal point of the laser beam.

6. Apparatus according to claim 1 or 4 in which the guide shoe is moveable between a retracted position disengaged form the cable and said range of positions of use.

7. Apparatus according to claim 1 or 4 further comprising tubular laser shielding means on the laser marking apparatus surrounding the laser beam, said tubular laser shielding means being engageable in an annular groove formed in the cable guidance means to substantially enclose the laser beam during laser marking.

8. Apparatus according to claim 1, further including a protective sleeve member associated with each of said cables, said protective sleeve member being constrained to prevent the bend radius to which said cables are subjected, from reducing below a minimum value.

9. Apparatus according to claim 8 including an interface arrangement operative between the cable source and the robotic control means, the arrangement including a park rail having means for releasably holding the leading end of each cable and of each protective sleeve member, each protective sleeve member including means for engaging the park rail and means for simultaneously engaging the robotic control means during cable removal form and replacement to the park rail.

10. Apparatus according to claim 9 in which the means on the protective sleeve member for engaging both the park rail and robotic control means comprises spaced grooves to be gripped by jaws on both the park rail and robotic control means.

11. Apparatus according to claim 1 in which said conveying means comprises dual longitudinal conveyor belts having adjacent surfaces in close abutment to engage and convey cable from a remainder of said apparatus without imposing a significant tension on the cable emerging from the remainder of the apparatus.

12. Apparatus according to claim 11 in which the longitudinal speed of the belts is in the range of 95 to 99% speed of cable leaving the remainder of the apparatus.

13. Apparatus according to claim 12 in which one end of the cable is held at a position to one side of the conveying means such that a loop of cable engages between the belts and is conveyed by the conveying means form the remainder of the apparatus.

14. Apparatus according to claim 13 in which, once the cable has been cut and separated from the cable at the source, the cut end is conveyed along the conveying means until tension form a held end of the cable unwinds the loop and the cable is substantially fully extended whereupon said tension draws the cut end sideways and outwardly from between the belts for the complete cable to fall into a receptacle disposed alongside the belts.

15. Apparatus according to claim 11 in which the opposed belts are in spaced relationship for part of their length to assist entry of the cable therebetween.

16. Apparatus according to claim 3 in which said at least one first pulley is rotatably mounted on a swingable arm.

17. Apparatus according to claim 16 in which swinging movement of the arm is used to control operation of a powered de-reeling motor to drive the cable reel.

18. Apparatus according to claim 17 in which the position of the swingable arm operates at least an on switch and an off switch spaced therefrom on the arc of movement of the arm.

19. Apparatus according to claim 16 including motor speed control member given a speed signal to the motor dependant upon the position of the swingable arm on its arc of movement.

* * * * *